(12) United States Patent
Løken et al.

(10) Patent No.: US 11,004,029 B2
(45) Date of Patent: May 11, 2021

(54) METHOD AND SYSTEM FOR STORING AND RETRIEVING PACKAGING AND RE-PACKAGING RELATIONS

(71) Applicant: KEZZLER AS, Oslo (NO)

(72) Inventors: Magnar Løken, Oslo (NO); Morten Haraldsen, Holmestrand (NO)

(73) Assignee: KEZZLER AS, Oslo (NO)

( * ) Notice: Subject to any disclaimer, the term of this patent is extended or adjusted under 35 U.S.C. 154(b) by 0 days.

(21) Appl. No.: 16/847,968

(22) Filed: Apr. 14, 2020

(65) Prior Publication Data

US 2020/0242550 A1 Jul. 30, 2020

Related U.S. Application Data

(63) Continuation of application No. 16/101,736, filed on Aug. 13, 2018, now Pat. No. 10,650,343, which is a continuation of application No. 14/654,362, filed as application No. PCT/NO2013/050222 on Dec. 13, 2013, now Pat. No. 10,074,063.

(60) Provisional application No. 61/745,364, filed on Dec. 21, 2012.

(30) Foreign Application Priority Data

Dec. 21, 2012 (EP) .................................. 12008592

(51) Int. Cl.
*G06Q 10/08* (2012.01)
*G09C 1/00* (2006.01)

(52) U.S. Cl.
CPC ....... *G06Q 10/0833* (2013.01); *G06Q 10/087* (2013.01); *G09C 1/00* (2013.01)

(58) Field of Classification Search
CPC ..... G06Q 10/0833; G06Q 10/087; G09C 1/00
See application file for complete search history.

(56) References Cited

U.S. PATENT DOCUMENTS

2012/0069992 A1* 3/2012 Jozwiak ................. G06F 21/16
380/28
2012/0130868 A1* 5/2012 Loken ................... G07D 7/0047
705/28
2020/0130868 A1 4/2020 Pellegrino et al.

* cited by examiner

*Primary Examiner* — A. Hunter Wilder
*Assistant Examiner* — Joseph M Mutschler
(74) *Attorney, Agent, or Firm* — Birch, Stewart, Kolasch & Birch, LLP

(57) ABSTRACT

A method and system for storing and retrieving a packaging hierarchy of traceable physical items includes at an item marking location, marking physical items to be packaged in the packaging hierarchy, with a unique code with a first and second identifier, transferring packaging relationships between the codes to a track and trace system, identifying for each code in the packaging relationships, hierarchical code relations expressed as parent and/or child codes, and for each code, storing the hierarchical code relations in a section of a data storage location of the first computer system, wherein a start position of the section is determined by a combination of the first and second identifiers of the code.

12 Claims, 7 Drawing Sheets

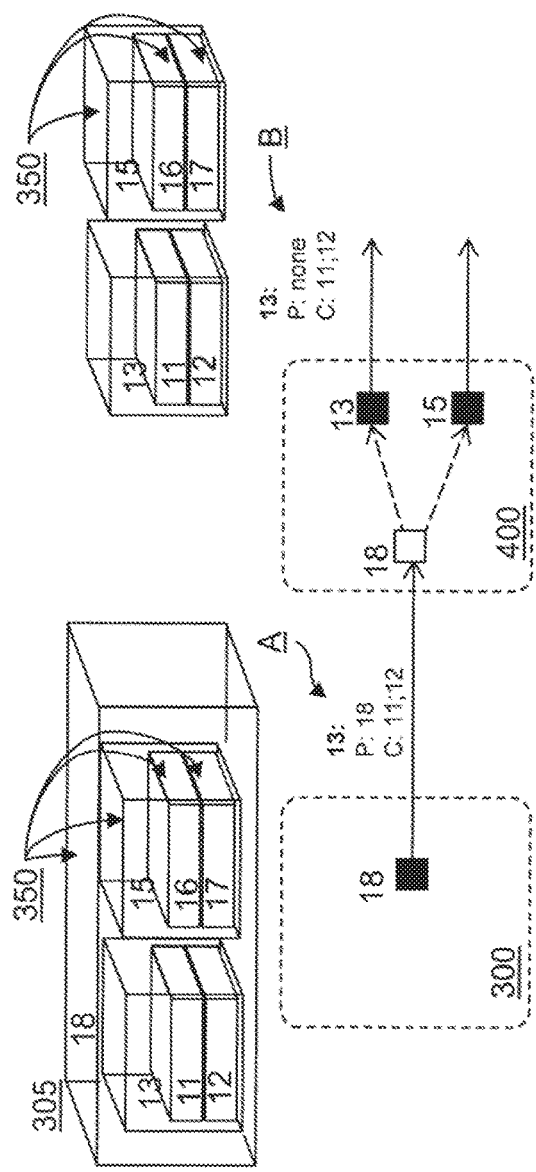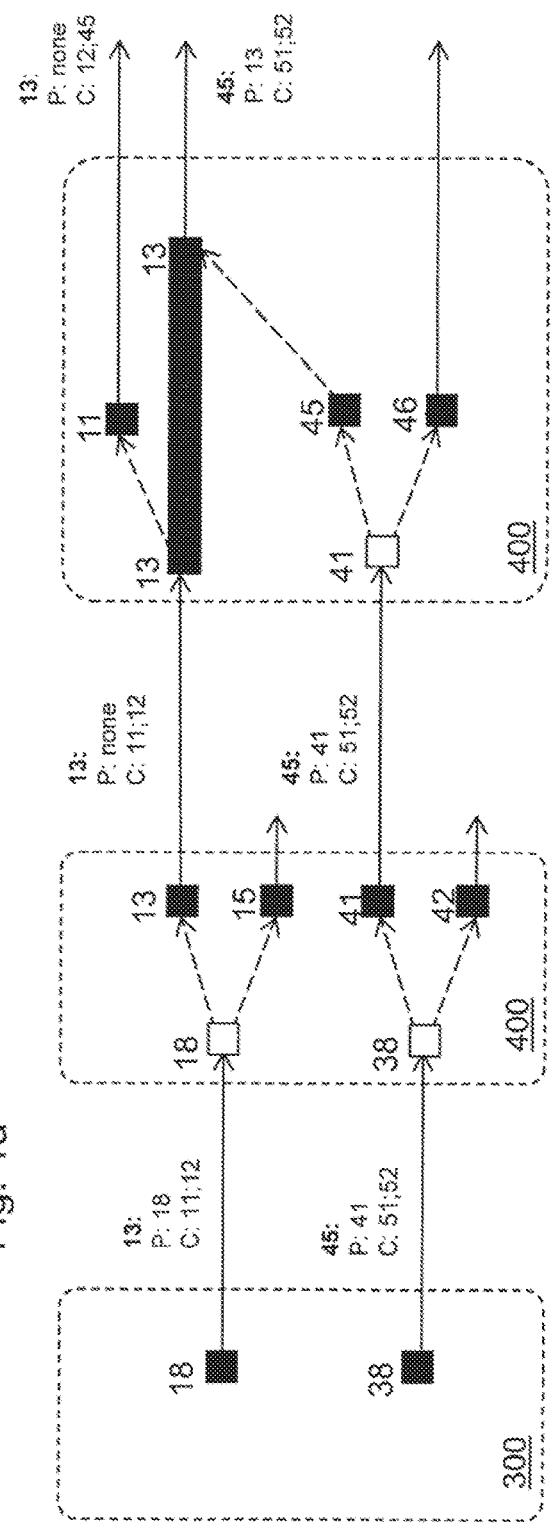
Fig. 1a
Fig. 1b

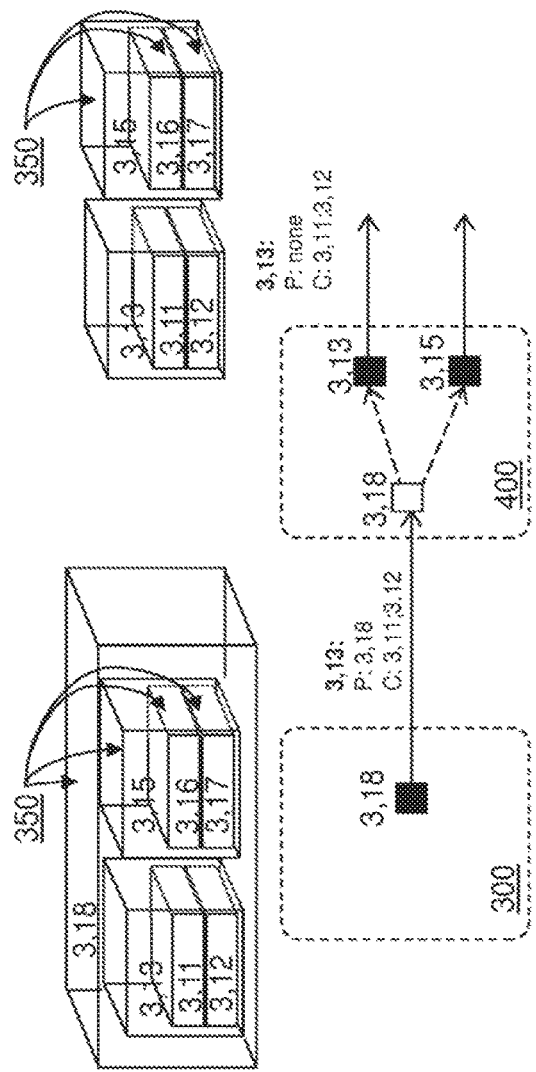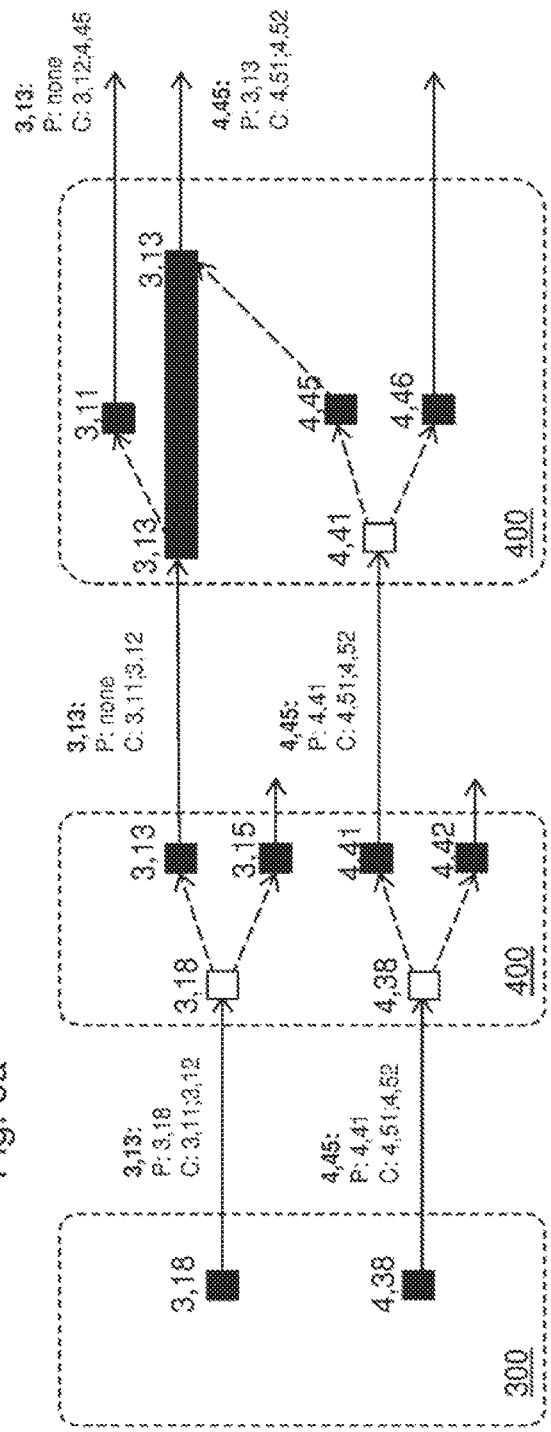
Fig. 3a
Fig. 3b

METHOD AND SYSTEM FOR STORING AND RETRIEVING PACKAGING AND RE-PACKAGING RELATIONS

CROSS REFERENCE TO RELATED APPLICATIONS

This application is a Continuation of U.S. application Ser. No. 16/101,736, filed on Aug. 13, 2018, which is a Continuation of U.S. application Ser. No. 14/654,362, filed on Jun. 19, 2015 (now U.S. Pat. No. 10,074,063, issued on Sep. 11, 2018) which is the National Phase of PCT International Application No. PCT/NO2013/050222, filed on Dec. 13, 2013, which claims priority under 35 U.S.C. 119(e) to U.S. Provisional Application No. 61/745,364, filed on Dec. 21, 2012 and under 35 U.S.C. 119(a) to Patent Application No. 12008592.3, filed in Europe on Dec. 21, 2012, all of which are hereby expressly incorporated by reference into the present application.

FIELD OF THE INVENTION

The invention relates to the storage and retrieval of track and trace information. More specifically it relates to a system and method for storing and retrieving a packaging hierarchy of traceable physical items marked with a unique code. Re-packaging at various distribution points in the supply chain when the products are on their way to their end customers is supported by the invention.

BACKGROUND OF THE INVENTION

Track and Trace systems for tracking and tracing of manufactured items is well known in the industry. Counterfeiting affects both the manufacturer and the public. E.g. in the field of pharmaceuticals, fake medicines may have no effect, or they can have dangerous side effects.

The systems used for preventing counterfeiting are implemented in a number of different ways.

One group of technology in the field is concerned with how to mark items and how to read back the information from the items to avoid copying of products. To avoid copying, the items can be marked with invisible markers, encrypted codes, RFID tags etc. It should be difficult for a counterfeiter to discover and decipher the information marked on the item, since this would enable the counterfeiter to copy the items and the marking in a way that would lead a consumer to believe they buy the original product.

Another group of technology is more concerned with how to follow, or trace an item from the manufacture to the end customer. By controlling the supply chain, and especially what happens to the items when being received and shipped in the distribution points, the possibility of successful counterfeiting or other fraudulent activities is reduced. This is commonly referred to as secure track and trace.

A secure track and trace system is surveying and managing all goods having been marked and registered with a unique identifier, and at the same time controlling all parties allowed to handle the products, all the way from the manufacture to the end consumer.

Track and trace systems according to background art works in the way that product items and associated transportation units are marked with a unique identifier. This identifier is then utilized to continuously authenticate the product in the supply chain. If the authentication process has a positive outcome, i.e. the product and code has been determined to be genuine, additional information related to the product and the present stage of the supply chain may be recorded and stored for later retrieval and analysis. The pivotal information that is recorded during the addition of a new tracking record is the identity of the product or transportation unit, the location and the time and also information about the operator. If available, the devices and method by which the product was authenticated, as well as other circumstantial and pertinent information may also be recorded in the tracking record.

This series of tracking records recorded by the track and trace system will result in a complete history of the handling of the product in the supply chain, that might be presented and audited at any time for security or other purposes.

The two groups of technologies described above are often combined to ensure maximum control of the supply chain and the end users confidence in the purchased goods.

European patent publication EP2104067A1 describes a method and apparatus for identifying, authenticating, tracking and tracing manufactured items in containers, where each container is suitable for containing one or more units.

US patent application 2011/0154046A1 describes a method and apparatus for storage of data for a batch of manufactured items. Each item is marked with a unique identifier from a set of unique identifiers within a pre-defined range. The number of unique identifiers is larger than the number of manufactured items, and some of the unique identifiers within the range will not be used. The unused identifiers are identified.

US patent application 2012/0130868A1 discloses a system and a method for tracking and tracing items comprising generating a group of unique codes, wherein each code is a unique encrypted reference, transferring the unique codes to an item marking location and marking the items. An item can be tracked by transferring the code marked on the item to the track and trace system where it is decrypted, and based on the unique code, creating a tracking record in a unique storage location, where the unique reference refers to the unique storage location. A tree structure resembling the packaging hierarchy is disclosed, where the nodes in the tree are referenced by the unique code.

Very seldom a product is sent directly from the factory to the end customer. As an example the smallest sellable item may be a first package of medicine comprising 20 capsules. 10 first packages are stored in a second package, 50 second packages are stored in a third package and 100 third packages are transported on the same pallet from the factory. Then, to continue the example, the pallet is transported to the first distribution point. Here 30 of the third packages on the pallet are loaded onto a new pallet together with other packages. In the next distribution point one of the third packages are unpacked and the 50 second packages inside are put in different new boxes with other goods having the same destination. This re-packaging may go on until the products reach their final destination.

According to the standardization organisation GS1, a traceable item is a physical object where there may be a need to retrieve information about its history, application, or location. The level at which the traceable item is defined within a product packaging or logistical hierarchy is dependent on the industry and degree of control required. A traceable item may be related to another traceable item.

According to the principles of secure track and trace, the location of each packaged item should be traceable at any time. However, usually only the visible items, i.e. the outer packages, and not the inner, are tracked and traced in the distribution points, since it would be impractical to open all packages in every location just to see what they contain.

Further, this natural temporarily concealment of the inner items is a security benefit in itself since their unique codes are protected from being known by parties with malicious intents. Various procedures and spot checks can utilize this concealment for security purposes. It is therefore important to know the packaging relationships of an item, e.g. the identity of the third package in the example above comprising the specific traced second package. The specific third package will in this case be the parent. Likewise, if the third package was traced, the identity of all the second packages it contains should be available. The second packages are child items of the third package. In essence the packaging structure that relates all items with all the other items, makes it possible when knowing a given item and its code, to implicitly manage and trace other items and codes based on that said code, without the need to read or otherwise record those codes as such.

Most track and trace systems use tracking records in a database to store information about the items in the supply chain as described above. However, one of the problems with databases is that for very large numbers of items the performance needed to provide an acceptable level of system response time has found to be too unpredictable as well as inadequate, since an index for the large amounts of data has to be managed. For the handling of large-amounts of re-packaged items, this problem increases.

The background art does therefore not disclose how to handle significant volumes of packaging structures and re-packaging of items in the track and trace system during their progress and advance in the supply chain in an effective way.

FIGURE CAPTIONS

FIGS. 1a, 1b and 1c illustrate example packaging hierarchies after initial packaging and re-packaging, where each of the physical items are marked with an identifying number. FIG. 1a illustrates the packaging hierarchy used further in FIG. 2, while FIGS. 1b and 1c exemplifies more complex hierarchies and re-packaging. In all figures some parent and child relationships are shown.

FIGS. 3a, 3b and 3c illustrate the same example packaging hierarchies as in FIGS. 1a-1c, but now with two level codes identifying the physical items.

SHORT SUMMARY OF THE INVENTION

Figure 1C:
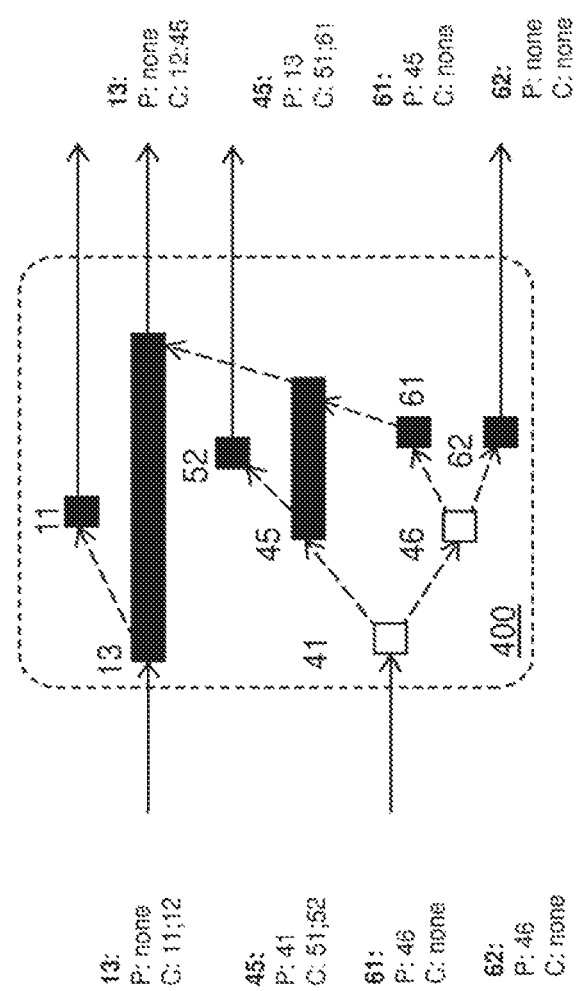

In the present invention a method and a system that is able to handle re-packaging of marked physical items are disclosed. The method and system discloses storage and retrieval of the initial parent and child packaging relationship as well as later modified packaging relationships as a result of re-packaging of the marked physical items.

In the field of track and trace, the number of items handled may be very large. It is therefore important that the track and trace system can provide the required response for updating information related to re-packaging of the physical items, as well as for the response when specific items are traced. A side effect of re-packaging a specific physical item is that the physical item itself can be a container that contains other containers etc., and the number of child items affected by the re-packaging may be large.

The invention discloses a data structure for re-packaging where only a small update of information is required for a re-packaging involving a large number of elements in a distribution centre.

In addition the invention also discloses a data format with a small footprint that allows large data-structures to be stored in a limited memory. However, most important is that the combination of the data structure and the data format allows fast writing to- and reading from the memory where the information is stored.

With the proposed data format the complete packaging information, including the packaging history for a marked physical item will typically be well within the cluster size of 4 kB which is default for most file systems.

The invention is in a preferred embodiment a method for storing and retrieving a packaging hierarchy of traceable physical items, comprising the steps of;

at an item marking location, marking two or more physical items to be packaged in the packaging hierarchy, each with a unique code comprising at least a first identifier and a second identifier, and transferring packaging relationships between the codes of the marked physical items from a packaging computer system, to a first computer system of a track and trace system, in the first computer system identifying for each the code in the packaging relationships, hierarchical code relations expressed as parent and/or child codes, for each the code, storing the hierarchical code relations in a section of a data storage location of the first computer system, wherein a start position of the section is determined by a combination of the first and second identifiers of the code of the marked physical item.

The invention is also a corresponding track and trace system arranged for storing and retrieving a packaging hierarchy of traceable physical items, comprising;

a first computer system with one or more data storage locations, each with one or more sections, the first computer system arranged for;

receiving packaging relationships between unique codes marked on the physical items from a packaging computer system, wherein each code comprises at least a first identifier and a second identifier, identifying hierarchical code relations expressed as parent and/or child codes for each the code in the packaging relationships, and storing the hierarchical code relations for each the code in the section as described above.

According to an embodiment of the method, re-packaging may be performed by;

re-packaging the physical items into updated packaging relationships in a re-packaging location, transferring the updated packaging relationships to the first computer system of the track and trace system, in the track and trace system identifying for each the code in the updated packaging relationships, updated hierarchical code relations expressed as parent and/or child codes, and for each the code, adding the updated hierarchical code relations to the section of the data storage location, wherein a start position of the section is determined by the combination of the first and second identifiers of the code of the marked physical item.

One of the major advantages of the invention is this possibility to manage a dynamic mix and match of products in the form of marked physical items (350) in the supply chain that comprises re-packaging and re-organisation of the physical items.

When the method and system according to the invention is applied, it is not necessary to store tracking records for items that have a parent container. If we consider a real-life example where a container may contain e.g 1000 marked physical items, it is seen that the savings in storage capacity may be considerable, since only the one code is used to trace the other thousand implicitly.

One of the main advantages of the invention is that the same principle may be applied even if re-packaging occurs one or more times in the supply chain. The section will always contain the latest parent-child relationships of the marked physical item requested and based on this, the containing parent and contained children can be found before querying only the necessary tracking records which are larger and consequently slower to query than the parent-child relationships.

Another benefit of the present invention is that there are no restrictions of how the original source or sources of codes to be marked on the physical items are organised or structured in relation and compared to the resulting packaging structure and its actual recorded parent-child relations. For instance this means that the codes can be marked onto any product item completely freely. For instance there is no need to put codes on the physical items in any type of sequence or any other predetermined dispensing algorithm or procedure or method or synchronisation or arrangement. This is very beneficial as it would be very hard and impact production efficiency if it was required to mark a product item with what would be a pre-determined code during live production in real life. With the present invention any code can go onto any physical item. During the essentially "random" production process a given code can therefore end up been marked onto a single item such as a cigarette pack, as a carton, or a master case or the shipping pallet, in case of a tobacco packaging line.

Further this means that for internal arrangement or structure or format of the codes on the code source can be implemented in many ways, such as for instance being stored as codes in a file, or being generated by a code generation device or system at the marking location just immediately before being marked on the physical item.

The way and the procedures and methods employed to establish the actual resulting packaging structure, which principally includes marking the physical items and then recording the parent-child relationships that comprises the packaging structure can be designed and selected completely freely to suit the best method for a given production line or process. The present invention does not involve this process, but however one benefit of the present invention is that it makes it possible that it can be freely chosen without impacting storage of the packaging structure in the track and trace system.

Further the present invention makes it possible to record and store the parent-child relations freely in any type of format or structure or arrangement that will work as an intermediate storage before being transferred to the track and trace system. In the track and trace system this data and information will be then be converted and stored according to the present invention. The important feature of this storage and structure received from the marking and packaging process is that all parent-child relationships can be interpreted and extracted by another computer system.

As the updated and changed relationships are added, one benefit of the invention is that the complete history for a child code, that means all the relations that the child code has ever had is read out very efficiently as they all are stored as a coherent stream of data that are densely packed together.

Embodiments of the Invention

With reference to the attached drawings the method and the system according to the invention will now be explained in more detail.

FIGS. 1*a*, 1*b* and 1*c* illustrate by way of examples the lifetime of some packages in a supply chain from the manufacturing or packaging location via distribution centres to the end customer. For this invention, the marking of the packages with a unique code is important, and the location where marking is performed is named marking location (300). The marking location (300) may also be the location where the packages are manufactured and initially packaged. While unmarked packages may be part of the distribution, e.g. the innermost partition of packages not meant for sale, they will not be individually traced, and will therefore not be further treated in this document. The packages that have been marked with a unique code are named marked physical items (350). A marked physical item (350) may be a container for other marked physical items (350). This is shown in the upper part of FIG. 1*b*. In the example each marked physical item (350) is marked with a unique identifier e.g. printed onto the marked physical items (350).

The marked physical items (350) will usually pass through one or more distribution centres where the marked physical items (350) may be re-packaged and loaded onto a new carrier. The distribution centres are in the following named re-packaging locations (400). The final destination with the end customer is not shown in the Figures.

In FIGS. 1*a*, 1*b* and 1*c* the filled squares represent marked physical items (350) that are intended for further distribution, while the empty squares represent physical items (350) that are not intended for further distribution e.g. because they are empty after removing all the contained physical items (350) in a distribution point. The sizes of the squares have no significance except for illustration purposes.

Parent and child relationships for a marked physical item (350) play an important role in the invention, and in the following examples it will be shown how child and parent relationships may be altered due to re-packaging.

In the example shown in FIG. 1*a* the parent and child relationships for marked physical item (350) marked with unique identifier 13 is shown after initial marking (A) and after re-packaging (B). After initial marking and packaging the parent (P) marked physical item (350) is 18 and the child (C) marked items (350) are 11 and 12. In the re-packaging location (400) 13 and 15 are taken out of the parent container 18 which is now empty and not used for further distribution in this example. 13 and 15 are further distributed from the re-packaging location (400). After re-packaging 13 has no parent relationship while it still contains the same child items 11 and 12.

Considering now the example in FIG. 1*b*, where two container marked physical items (350) 18 and 38 are shipped from the marking location (300), where the upper container 18 is similar to the container in the previous example. The products in the two containers may be from the same production batch or from different production batches and can contain similar products or different products. They may also each contain a mixture of different products already at the marking location (300), or mix product types in any of the distribution points or re-packaging location along the way. One of the major advantages of the invention is this possibility to manage a dynamic mix and match of products in the form of marked physical items (350) in the supply chain.

For marked physical item (350) with the code 18 everything is similar to the example in FIG. 1a after the first re-packaging location (400). In the next repackaging location (400), right in FIG. 1b, container 13 is opened to remove the child package 11. However, note that child 12 still remains in 13. Since marked physical item (350) 45 is to be sent to the same destination as 12 and 13, and there now is room in 13, 41 is unpacked to liberate 45, which is moved to 13. After re-packaging 13 now has 12 and 45 as child packages, while 45 has 13 as parent and in this example contains 51 and 52, which is the same as it did initially in the marking location (300).

The examples provided in FIGS. 1a and 1b are just examples of marking, packaging and re-packaging used to explain the invention. In real life package distribution, the lifetime of a marked physical item (350) may be much more complex. First, of all the number of packaging levels, i.e. how the number of parent levels between the innermost marked physical item (350), may be larger or smaller. Second, the size of the marked physical items (350) with the same parent may, or may not vary. Third, the number of re-packaging locations (400) may be smaller or larger. Fourth, the complexity of the re-packaging may be much more complex than shown in FIGS. 1a and 1b. Packages involved in repackaging may come from different factories and arrive in the re-packaging location at different times. In the example only two different packages are shown to be re-packaged together, however, there is no limitation, other than physical, how many packages of different types that may be assembled into a container. In addition the number of levels of re-packaging may be larger than one.

In FIG. 1c a bit more complexity during re-packaging in the re-packaging location (400) where the incoming packages are the same as in the right most repackaging location (400) of FIG. 1c is shown by way of an example. E.g. if 45 contains 51 and 52, and 46 contains 61 and 62, then 52 could have been taken out of 45 and replaced with 61 from 46 before 45 had been re-packaged into 13.

Re-packaging like this may happen in other re-packaging locations (400), or distribution centres along the supply chain.

According to prior art as described previously, several tracking records for each marked physical items (350) would typically be stored in a database to reflect the changes taking effect in each re-packaging location. However, a database is not well suited for dynamically updating- or fast lookup of packaging hierarchies.

It has been an object of the invention to support complex re-packaging as described above, where the shortcomings in background art are solved. The embodiments of the invention supporting re-packaging will now be described in more detail.

Figure 2:
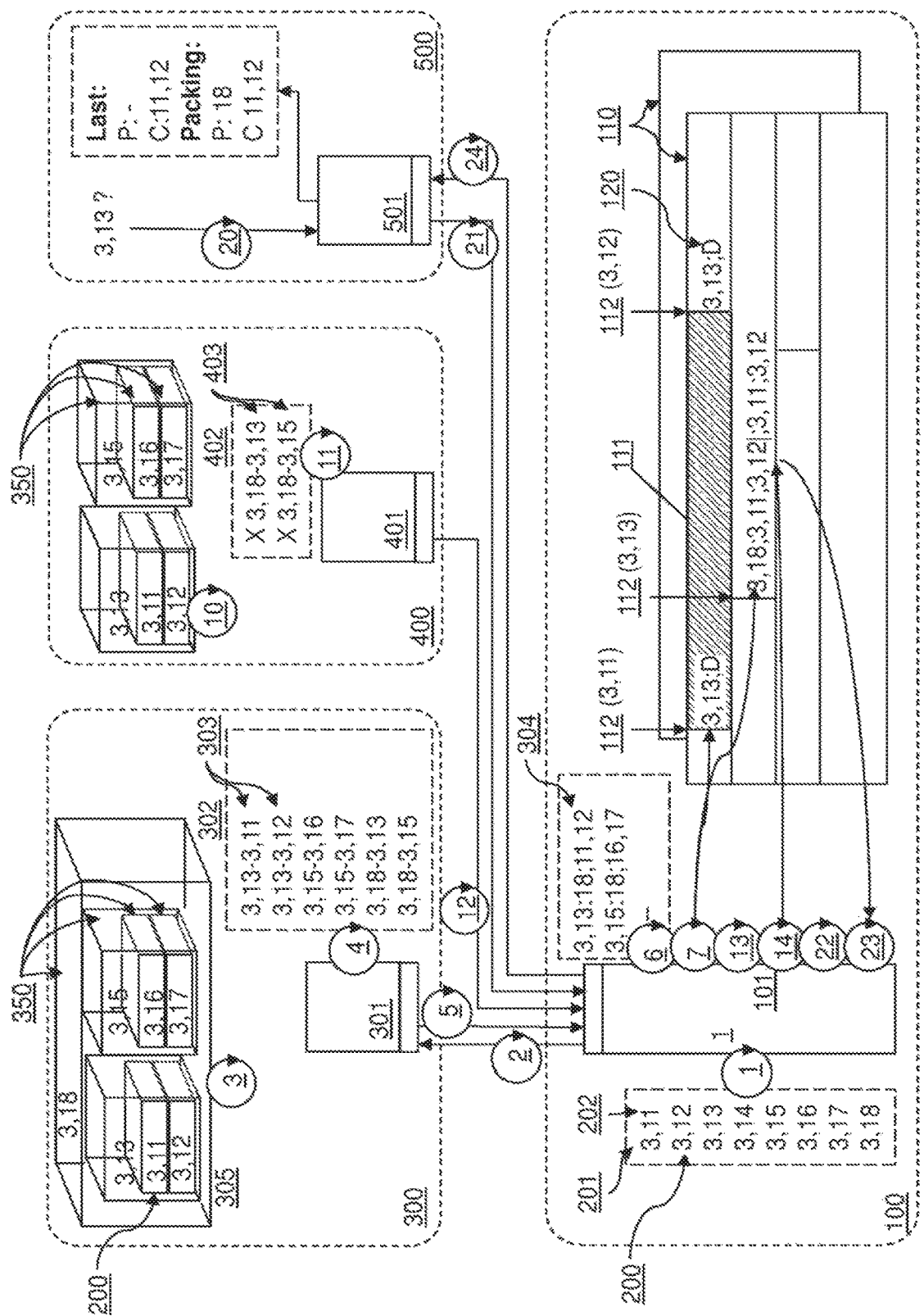
FIG. 2 illustrates in a schematic view embodiments of the invention.

FIG. 2 illustrates in an example physical and methodical elements according to an embodiment of the invention. To facilitate reading of the figure, methodological steps are indicated with a circle and arrow.

The main, rounded rectangles of the figure represent different locations where the actions may taking place, and where apparatus and devices, such as computers or computer terminals may be located. More specifically, the reference numbers (300), (400) and (500) indicate locations that are typically involved during the distribution of marked physical items (350).

The marking location (300) is where the physical items (350) are marked with a unique code (200), and will typically be part of a factory where the products are manufactured and packed. However, what is important for the invention is that the physical items are marked and packed in the marking location (300). Note that a marked physical item (350) can be a container for smaller marked physical items (350). Whether the products in the marked physical items (350) are manufactured here or somewhere else is of little importance. After the marking in the marking location (300) the physical items are sent to the first re-packaging location (400).

The re-packaging location (400) is typically a distribution centre where some of the outer containers or marked physical items (350) are opened and one or more of the inner marked physical items (350) are taken out and further distributed alone or put in another physical item (350) together with some other marked physical items (350).

The tracing location (500) may be any location where there is a need to retrieve information about a specific marked physical item (350). Typically parties with some sort of ownership of the distribution process or the distributed products may have the possibility to retrieve details of a marked physical item (350). The end customer may also have access to this service, at least in a restricted version.

In the bottom of the figure the track and trace system (100), which is the main element of the invention, is shown. In any of the embodiments explained below the track and trace system (100) may be in a physical location different from the marking location (300). This is useful when the track and trace system (100) is used to manage products from many manufacturers or many manufacturing locations, and is the more common situation. However, it is also within the scope of the present invention that the track and trace system (100) is co-located with the marking location (300). This situation may arise if the marking location (300) is used to mark physical items (350) from many manufacturing sites, or if there is only one large manufacturing and marking location (300).

In order to follow and trace the physical items they have to be marked with a unique code (200). There may be different strategies for which items to mark with the code (200), however, items that are not marked cannot be traced if they are not in a marked container packaged item (350). The deepest level of marking will usually depend on the smallest packaged item (350) that is distributed on its own. In the example in FIGS. 1a-1c, three levels of marked physical items (350) are shown.

To make it easier to understand the example in FIG. 2, the packaging relationships between the marked physical items (350) are the same as in FIGS. 1a, 1b and 1c.

However, the identifiers of the physical items (350) are now the two-level unique code (200) instead of the single level identifier in FIGS. 1a, 1b and 1c.

Figure 3C:
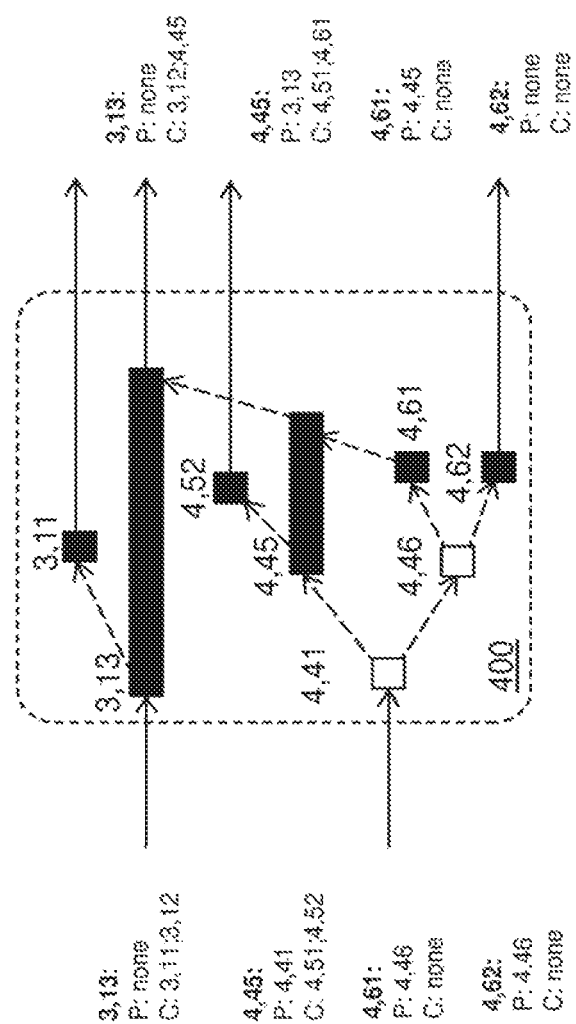

In FIGS. 3a, 3b and 3c the packaging relationships corresponding to the packaging relationships in FIGS. 1a, 1b and 1c respectively are shown, but here with a two level unique code (200) identifier. This also corresponds to the marking in FIG. 2.

At the highest packaging level it can be seen that the physical item (350) marked with the unique code (200) 3,18 contains two physical items (350) marked with the codes (200) 3,13 and 3,15. The physical items (350) marked with the code (200) 3,13 and 3,15 further contains two physical items (350) marked with the codes (200) 3,11 and 3,12, and 3,16 and 3,17 respectively. The physical items (350) marked with the codes (200) 3,11, 3,12, 3,16 and 3,17 may also contain items, but they are not marked with a unique code (200).

The invention is in a preferred embodiment a method for storing and retrieving a packaging hierarchy (305) of traceable physical items (350), comprising the steps of;

at an item marking location (300), marking (3) two or more physical items (350) to be packaged in the packaging hierarchy (305), each with a unique code (200) comprising at least a first identifier (201) and a second identifier (202), and transferring (5) packaging relationships (303) between the codes (200) of the marked physical items (350) from a packaging computer system (301), to a first computer system (101) of a track and trace system (100), in the first computer system (101) identifying (6) for each the code (200) in the packaging relationships (303), hierarchical code relations (304) expressed as parent and/or child codes (200), for each the code (200), storing (7) the hierarchical code relations (304) in a section (111) of a data storage location (110) of the first computer system (100), wherein a start position (112) of the section (111) is determined by a combination of the first and second identifiers (201, 202) of the code (200) of the marked physical item (350).

According to an embodiment the invention is also a track and trace system (100) arranged for storing and retrieving a packaging hierarchy (305) of traceable physical items (350), comprising;

a first computer system (101) with one or more data storage locations (110), each with one or more sections (111), the first computer system (101) arranged for;

receiving packaging relationships (303) between unique codes (200) marked on the physical items (350) from a packaging computer system (301), wherein each code (200) comprises at least a first identifier (201) and a second identifier (202), identifying (6) hierarchical code relations (304) expressed as parent and/or child codes (200) for each the code (200) in the packaging relationships (303), and storing (7) the hierarchical code relations (304) for each the code (200) in the section (111), wherein a start position (112) of the section (111) is determined by a combination of the first and second identifiers (201, 202) of the code (200) of the marked physical item (350).

The description below applies to both the method and the system according to the invention.

The steps of the method according to his embodiment will now be described in more detail with reference to the examples given above.

In this embodiment the unique codes (200) before being marked on the physical items (350) may have been generated by any system capable of generating such codes, since they have no relationship to any physical item (350) before marking. At the marking location (300) the physical items are then marked (3) with the codes (200) and become marked physical items (350). Note that not all the available codes (200) have to be used.

Two or more marked physical items (350) are then packaged, where some of the marked physical items (350) are containers for other marked physical items (350). This packaging process results in a packaging hierarchy (305) between the marked physical items (350) where each marked physical items (350) may have parent and/or child relationships. If the marked physical items (350) are contained in a container, the container is the parent. If the marked physical item (350) contains other marked physical items (350), the contained marked physical items (350) are children. The packaging hierarchy (305) is hierarchical. It will then be understood that the packaging hierarchy (305) will resemble a tree structure, where the root, or hierarch, in the tree is the highest level parent, i.e. the container marked physical item (350) that contains all the other marked physical items (350). In FIG. 2, the package, or marked physical item (350) marked with the code (200) 3,18 is the root in the packaging hierarchy in the marking location (300).

After the marking (3) and registration (4) steps, the packaging relationships (303) are transferred (5) to the track and trace system (100).

There are several ways of performing this transfer of information. Typically the packaging tree structure (302) is then transferred over the Internet from the second computer system (301) to a computer system (301) of the Track and Trace system (100). However, any other transfer of the codes, encrypted or unencrypted could be used.

In an embodiment the packaging relationships (303) are sent in directly to the track and trace system (100) as a data stream. This could be the case if the packaging computer system (301) sends packaging relationships (303) e.g. each time a package is marked, and the unique code (200) of the parent is known. The packaging relationships (303) could then be sent in chunks, or one-by-one without having to store the information in the packaging computer system (301) of the item marking location (300).

Another way of performing this transfer of packaging relationships (303) is to store the packaging relationships (303) in a data structure in a data file or memory of the packaging computer system (301) before transferring the file with the aggregated information to the track and trace system (100).

According to an embodiment of the invention the method then comprises registering (4), in the packaging computer system (301), the packaging hierarchy (305) in an aggregate data file (302) comprising the packaging relationships (303), transferring (5) the aggregate data file (302) to the first computer system (101) of the track and trace system (100), in the first computer system (101) identifying (6) hierarchical code relations (304) expressed as parent and/or child codes (200) for each the code (200) from the packaging relationships (303) in the aggregate data file (302). The aggregate data file (302) may be a simple text file or a binary file of a second computer system (301).

In FIG. 2 an example of such an aggregate data file (302) is shown, where each packaging relationship (303) is registered in a list structure. Another example could be to store all parents and grandparents etc. for each lowest level child. In the example of FIG. 2 an entry in such a list could look like: 3,11-3,13-3,18 for the marked physical item 3,11. The actual format of the aggregate data file (302) is not important as long as the format is known, and it is possible to read out the packaging relationships. The aggregate data file (302) may be a simple text file or a binary file of a second computer system (301).

With respect to the step of registering (4) above, it should be noted that registering may be performed before, during or after marking of the items or packages. If registering of the aggregate data file (302) is performed before marking (3), it means that the process responsible for marking has to mark the packages according to the aggregate data file (302). If the registration is performed during marking, the aggregate data file (302) may be build up incrementally as the packages are marked and packed into containers. Either the marking or registration process should pick codes (200) to mark on the items from the list of generated codes (200). Lastly, if the registration is performed after marking, the registration will have to depend on the information from the packaging system to create the aggregate data file (302).

In the Track and Trace system (100) hierarchical code relations or (304) for the packaging relationships (303) are then identified. The hierarchical code relations (304) are expressed as parent and/or child codes (200) for the codes (200) in the packaging relationships (303). The term hierarchical interaction is often used as the terminology for this type of relationship between an item and its direct superior or subordinate. This means that a hierarchical code relation (304) is an identification of a parent or children of a current code (200). A hierarchical code relation (304) may be empty, null, or non-existent if there is no parent or children. An example of hierarchical code relations (304) is given in FIG. 2, e.g. 3,13:18;11,12 means that code 3,13 has parent 3,18 and children 3,11 and 3,12. The formatting of the hierarchical code relation (304) e.g. the deliminators can be of any type suitable for this application.

The format and structure of the incoming packaging relationships (303) are not necessarily the same as required for further processing in the Track and Trace system (100), so conversion or transformation of the packaging relationships (303) in the aggregate data file (302) to an internal format of the Track and Trace system (100) may be necessary. According to this invention the step of identifying (6) hierarchical code relations (304) comprises transforming the packaging relationships (303) to hierarchical code relations (304) expressed as parent and/or child codes (200).

Hierarchical code relations (304) for each of the marked physical items (350) that have been identified in the previous step are then stored (7) in a section (111) of a data storage location (110) of the computer (101) of the track and trace system (100).

The data storage location (110) is a physical data storage that can be identified and used for storing of data by the computer (101) of the track and trace system (100), such as a local or remote file system, a local or remote memory etc. It can also be any partition or sub-partition of such as a data storage.

The section (111) is an identifiable location of a storage location (110) that may e.g. be the start of a specific cluster or a block of data in a file system or memory.

The start of the section (111) is determined by a combination of the first and second identifier (201, 202) of the code (200). As the child and parent relationships are progressively changed and added, the section (111) is effectively made longer, and it may be necessary to determine the end of the section (111). There are many possible ways of determining the end. A method for determining the end can be implemented in the overlying computer system (101) and software based on optimizing parameters that are given by the application. For instance if it is decided that only three updates per code (200) is allowed, then the overlying software reading from the storage will implement that the storage sections (111) are exactly three additions long. The preferred embodiment for the present invention, of determining the end of the storage section, is a general and flexible method that allows the section (111) to be expanded indefinitely. At the start of the section (111) the information about the end (112) of the section is stored. In general the nomination is written as [P|ƒ|Cn:;:Cm|Δ] where ƒ is information that makes it possible to determine the section end (112), P is the parent, Cn:;:Cm are children, Δ is an optional item parameter (120) and | is a delimiter within one reading. ƒ can also be useful for the overlying software computer system (101) as that information might be number of children, i.e. counting until the end, or for instance the number of bits that the section has. As the section (111) is updated with data and relations, and expanded, the ƒ data about the end is also updated to reflect the new and updated section length and content.

It should be noted that in the examples given below P and C are written as a single identifier to make the examples easier to read. However, according to the invention the codes stored are usually in a two part form. This means that the example [3,11|3,21;3,56;3,107|Δ|], where the digit "3" is the first identifier, is simplified to [11|21;56;107|Δ|]. This simplification is possible when all codes of a storage location share the same first identifier (201), but would not support re-packaging where codes with different first identifiers (201) are in the same packaging relationship.

As an example the section with the following content [11|21;56;107|Δ|56;404|Δ|] may be written as [11|32|21;56; 107|Δ|56;404|Δ|], where ƒ is 32 bits.

After having changed the section (111), after e.g. adding and removing children, the section end (112) data ƒ is updated and the updated section (111) would be written and stored like the following: [11|56|21;56;107|Δ|56;404|Δ|877; 255;677|Δ|] where 56 now specifies the end of the section to be 56 bits from the start of the section.

When a parent child relation is stored, as [PCn|:;:Cm|Δ] it is very efficient for searching and traversing a packaging structure in the downward direction; from the top to bottom.

Another storage location is arranged to determine the start of the storage location based on a child-parent relationship. The child-parent relationship may be expressed as [C|P|Δ]. A parent code may have many child codes. However, a child code can only have one parent code. This storage and retrieval according to the invention is optimised and very efficient for traversing and retrieving information in the upward direction; from bottom to top in the packaging hierarchy, due to the packaging relations between the traceable items. In this way, using the previous example for the parent-child relationship gives: [11|21;56;107|Δ] expressed as a child-parent relationship would be stored as [21|11|Δ], [56|11|Δ] and [107|11|Δ].

To further illustrate how changes and updates are managed using storage based on child-parent relationships, again assume that child 21 is removed from parent 11 to 33, and that at the same time a new child 404 is put under the aforementioned parent code from parent 66. The data storage would then be arranged like the following: [11|21;56; 107|Δ|56;104|Δ|]. In this way using the previous example the parent-child relationship [11|21;56;107|Δ], as a child-parent relationship would be stored as [21|11|33|Δ] and [56;11|Δ|] and [107;11|Δ|] and the new [404|66|11|Δ|].

A start position (112) of the section (111) is determined by a combination of the first and second identifiers (201, 202) of the code (200) of the marked physical item (350) to be stored.

In an embodiment the first identifier (201) of a code (200) identifies a file partition of a file system and the second identifier (202) of the same code (200) identifies a unique position within the file partition.

According to an embodiment of the invention the parent hierarchical code relations (304) are stored in a parent storage location (110) of the computer (101) of the track and trace system (100) and the child hierarchical code relations (304) are stored in a child storage location (110) of the computer (101) of the track and trace system (100).

This may be advantageous in certain applications, e.g. where a root parent is to be found for a marked item (350). E.g. in FIG. 4 it is shown an example where several requests have to be made to find the root. In the sections (111) only parent data, together with a parent status, is stored for each code (200).

The storage of the packaging relationships (303) has several advantages that will become more evident in the reminder of the document, especially when tracing specific marked physical items (350) after re-packaging, and tracing marked physical items (350) contained in other marked physical items (350).

As explained above, the two level unique codes (200) may have been generated by one or more separate computer systems before they end up in the marking location (300). In an embodiment this is done in the first computer system (101) of the track and trace system (100). The step of generating (1) one or more unique codes (200) in the computer system (101) involves creating a list of two level codes, where the second identifier (202) is unique within the first identifier (201). In FIG. 2 a simple example is shown where unique codes (200) from 3,11 to 3,18 are generated. 3 is here the first identifier (201) and 11 to 18 are the second identifiers (202). In a real system the codes would be longer to handle a large number of items.

If the codes (200) are generated somewhere else than at the marking location (300) they will now have to be transferred (2) to the marking location (300). Typically the codes are then transferred over the Internet from the generating computer system (101) to a marking computer system (301) at the marking location. However, any other transfer of the codes, encrypted or unencrypted could be used.

The embodiments of the invention described above ensure that packaging relationships after the initial packaging and marking have been properly stored in the track and trace system. Further aspects related to re-packaging in distribution points, or re-packaging locations along the supply chain will now be explained.

In an embodiment the method for storing and retrieving a packaging hierarchy (305) of traceable physical items (350) according to claim 1, comprises the steps of;
  re-packaging (10) the physical items (350) into updated packaging relationships (403) in a re-packaging location (400),
  transferring (12) the updated packaging relationships (403) to the first computer system (101) of the track and trace system (100),
  in the track and trace system (100) identifying (13) for each the code (200) in the updated packaging relationships (403), updated hierarchical code relations (304) expressed as parent and/or child codes (200), and
  for each the code (200), adding (14) the updated hierarchical code relations (304) to the section (111) of the data storage location (110), wherein a start position (112) of the section (111) is determined by the combination of the first and second identifiers (201, 202) of the code (200) of the marked physical item (350).

The additional steps of the method according to his embodiment will now be described in more detail with reference to the examples given above.

When the marked physical items (350) arrives in a distribution point or re-packaging location (400), some of the packages may be re-packed. With regard to a specific marked physical item (350) involved in re-packaging, its packaging relationship (403) is updated.

If a parent container was present before re-packaging, the parent may be opened and completely removed, which means the specific marked physical item (350) was removed from the parent container. Otherwise a new parent may be assigned, which means that the specific marked physical item (350) has been put in a new container. Consequently the parent relationship has been updated.

If one or more children were present before re-packaging, one or more children may have been removed and possibly replaced by other children, meaning that the children relationship has been updated.

In the example of FIG. 2, and FIG. 3a, the package, or marked physical item (350) marked with the code 3,13 is removed from container 3,18 in the re-packaging location (400) and its parent relationship is updated to "none". Its child relationships are not changed.

After the re-packaging (10) steps, the updated packaging relationships (403) are transferred (12) to the track and trace system (100). Typically the updated packaging relationships (403) are then transferred over the Internet from the third computer system (401) to a computer system (101) of the Track and Trace system (100). However, any other transfer of the codes, encrypted or unencrypted could be used.

In an embodiment the updated packaging relationships (403) are sent in directly to the track and trace system (100) as a data stream. This could be the case if the packaging computer system (301) sends packaging relationships (303) e.g. each time a package is marked, and the unique code (200) of the parent is known. The updated packaging relationships (403) could then be sent in chunks, or one-by-one without having to store the information in the packaging computer system (301) of the item marking location (300).

Another way of performing this transfer of packaging relationships (303) is to store the updated packaging relationships (403) in a data structure in a data file or memory of the packaging computer system (301) before transferring the file with the aggregated information to the track and trace system (100) as described above for the transfer and reading the aggregate file after initial packaging.

In the Track and Trace system (100) hierarchical code relations or (304) for the updated packaging relationships (403) are then identified. The hierarchical code relations (304) are as before expressed as parent and/or child codes (200) for the codes (200) in the packaging relationships (303).

The format and structure of the incoming updated packaging relationships (403) is not necessarily the same as required for further processing in the Track and Trace system (100), so conversion or transformation of the updated packaging relationships (303) in the aggregate data file (302) to an internal format of the Track and Trace system (100) may be necessary as described above.

Changes in packaging structure when repacked are often sent to the track and trace system with what is known as «pick and pack» lists. The format and method of creating these list are not instrumental to the present invention as long as they make it possible to extract the required updated packaging relationships (303).

Hierarchical code relations (304) for each of the marked physical items (350) that have been identified in the previous step are then stored (7) in a section (111) of a data storage location (110) of the computer (101) of the track and trace system (100).

Updated packaging relationships (403) for each of the marked physical items (350) that have been identified in the previous step are then added (14) in the same section (111) of the storage location (110) of the computer (101) of the track and trace system (100) as the initial packaging relationships (303) for the same marked physical item (350) were stored after initial marking and packaging. The start position (112) of the section (111) is again determined by the combination of the first and second identifiers (201, 202) of the code (202) on the marked physical item (350).

In the example of FIG. 2, it can be seen that the section (111) for marked physical item 3,13 after re-packaging comprises the information: "3,18;3,11;3,12|;3,11;3,12". The information before "|" indicates that, initially after marking and packaging, 3,18 was the parent and 3,11 and 3,12 were children, while the information after "|" indicates that, after re-packaging, there is no parent, while 3,11 and 3,12 are still children. It should again be noted that the separators and format used here are selected to illustrate the example, and could be anything as long as it is possible to distinguish the various parts of information stored in the section (111).

The marked physical item (350) may be involved in further re-packaging in other re-packaging locations (400) before it reaches its final destination. One such example is given in FIG. 3b and FIG. 3c explained previously. The information in the section (111) should then be updated in the same way as described above, where updated packaging relationships (403) are added to the section (111). In this way, the section will contain a history of all initial and updated packaging relationships (303, 403) for a marked physical item (350).

The embodiments of the invention described above ensure that packaging relationships after re-packaging have been properly stored in the track and trace system. Further aspects related to retrieving this information, and additional information will now be explained.

When the marked physical item is transported on its way to the final destination, a party involved in selling, transporting and buying the product may have questions regarding the current status. According to an embodiment of the invention such status information can be obtained by querying the track and trace system (100) for information for a specific marked physical item (350) by providing the code (200) marked on the item.

In this embodiment the method comprises the steps of;
  entering (20) one or more codes (200) in a computer based terminal (501) in a tracing location (500),
  transferring (21) the codes (200) from the tracing location (500) to the track and trace system (100),
  identifying (22) the first and second identifiers (201, 202) of the codes (200) in the track and trace system (1)
  determining the start position (112) of the section (111) of the storage location (110) in the track and trace system (100),
  retrieving (23) the hierarchical code relations (304) stored in the section (111) for the codes (200),
  transferring (24) the hierarchical code relations (304) back to the computer based terminal (501).

The additional steps of the method according to his embodiment will now be described in more detail with reference to the examples given above.

A party with access to a required computer based terminal (501) and authorised to access the system, may enter codes (200) for one or more marked physical items (350) to be traced in the computer based terminal (501). The terminal may be any terminal capable of communicating with the track and trace system (100), such as a hand held terminal dedicated for tracing communicating with a proxy computer in the tracing location (500), or a standard computer with a web-browser, where the web-browser opens a page of a web server run by the track and trace system (100).

The codes (200) entered are then transferred (21) to the track and trace system (100). A secure Internet protocol, such as SSL, may be used for this purpose, but other code means of electronic communication may also be used.

When the track and trace system (100), and more specifically a computer system (101) of the track and trace system (100) receives the unique codes (200), the first and second identifiers (201, 202) are identified to find the start position (112) of the information for the marked physical item (350) for each unique code (200) to be traced.

The track and trace system (100) will then retrieve the information stored in the information from the relevant sections (111) directly by using the first and second identifiers (201, 202) as the address to look up. The first and second identifiers (201, 202) may in this context be looked at as a two-step pointer that points directly to the relevant information. The behaviour of the two-step pointer may also be seen as addition of two vectors, where the start of the second vector is the end of the first vector.

The information retrieved from the track and trace system (100) is then transferred back to the computer based terminal (501), and to the party that requested the tracing service. Again, a secure Internet protocol, such as SSL, may be used for this purpose, but other code means of electronic communication may also be used.

The information retrieved from the track and trace system (100), as described above, is often processed and combined with other information in the track and trace system (100) before returning it to the tracing location (500) to make the information more readable and/or understandable to a human. This also depends on the exact request from the computer based terminal (501), that may request a service where the packaging relationships (303) and updated packaging relationships (403) are only part of the requested service, or a means of obtaining other information.

The computer based terminal (501) may be communicating with other computers that share a common electronic data interchange (EDI), and where the request and response of the computer based terminal (501) are requests and responses on an EDI interface.

According to an embodiment of the invention, it is possible to store information related to each specific marked physical item (350) in the track and trace system (100). When tracing is requested this information may give the user important information about the item. Such information may be e.g. validity status that could tell the user that the traced item should not be for sale, that the item has been withdrawn etc. It could also contain more static product information such as serial number.

In this embodiment the step of registering (4) comprises transferring an item parameter (120) for each marked physical item (350) in the packaging relationship structure (302), and the step of identifying (6) comprises identifying the item parameter (120), and the step of storing (7) comprises storing the item parameter (120) in the section (111). FIG. 2 shows examples of such an item parameter (120) appended to the hierarchical code relations (304).

The item parameter (120) can be diversified and serve a multitude of purposes. Such information can be, but not limited to, time stamps, various flags and statuses such as recalled, rejected, quarantined, passed QA, returned, taxes paid and so on. Whatever information that would be useful in relation to the single code can be stored for efficient storage and retrieval. The change and update of such information is managed the same way as described for the packaging relationships. Information that is related to the code in the supply chain can also be stored as an item parameter (120), for instance the geological tracking location that the code (200) is at currently. In the same way, the reading of the data will give the full history of the item parameter (120).

It is important that this information resides in the section (111), which makes the information retrievable fast and easily. The format of the item parameter (120) in the section (111) may be any format suitable for this, such as clear text, enumerators, other encoded information etc. that is commonly understandable to the track and trace system (100) and the computer based terminal (501) of the tracing location (500).

It is further possible to store more specific information in tracking records. Tracking records may contain information regarding which items are located where, when they got there and conveyed/received by whom. All this information for a marked item (350) is not meant to be available in the section (111).

Figure 4:
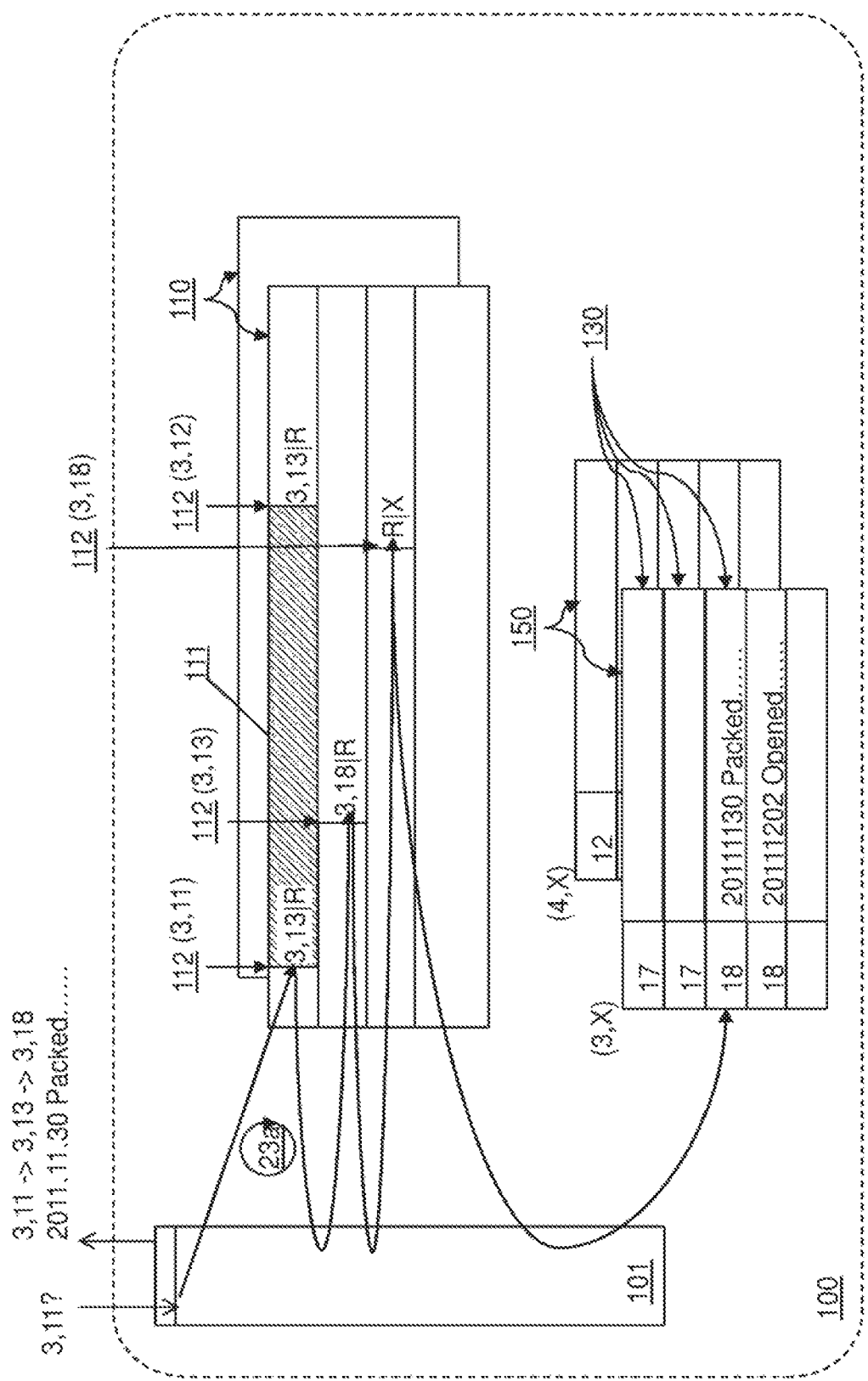
FIG. 4 illustrates in a schematic view how the tracking records of a root containing physical item can be found by walking through the hierarchical code relations according to the invention before querying the tracking records of the root container.

According to an embodiment of the invention as illustrated in FIG. 4, a tracking record (130) is stored in a second storage location (150) of the computer (101). The second storage location (150) may be a database or a flat file writeable and readable from the computer (101) of the track and trace system (100). According to an embodiment of the invention a position of the tracking records (130) is determined by a combination of the first and second identifiers (201, 202) of the code (200). In the example in FIG. 4 the tracking records where the first identifier (201)=3 are stored in one storage location (150) such as a file, while the tracking records where the first identifier (201)=4 are stored in a separate storage location (150).

Thus, as will be understood from the description, the combination of the two-level code (200), and the storage of hierarchical code relations (304) in the section (111), simplifies maintenance, i.e. writing and reading of tracking records when the marked physical item (350) is transported in the supply chain.

Consider for instance the case where a tracking record is created for item 3,18 during or after initial marking and packaging in the left part of FIG. 3b. A tracking record (130) is created in the second storage location (150) as can be seen in FIG. 4. In principle, no tracking record is necessary for the contained marked physical items 3,13, 3,11, 3,12 etc. as long as their parent-child relationships are registered as described previously.

In FIG. 4 it is further illustrated what may happen when item 3,11 is traced from outside the Track and Trace system (100). As can be seen the computer (101) will query the parent relation from the section (111) dedicated to item 3,11, and it will find that item 3,13 is the parent. Then a new query for the parent of 3,13 is performed, showing that 3,18 is the parent of 3,13, and eventually 3,18 is queried, where the response shows that 3,18 is the top parent. This is indicated by an R in FIG. 4, but it could have been any other indicator suitable for this purpose.

Knowing that 3,18 is the top container, or root, the computer (101) then requests the appropriate tracking records (130) from the second storage location (150). This tracking record (130) may contain information as described above regarding which, where, when by whom etc. for the marked physical item (350) marked with the code (200) 3,18.

The complete information about item 3,11 being contained in 3,18 via 3,13 and the extensive information from the tracking record of 3,18 may then be sent back to the requesting party where only a single query for tracking records was necessary.

According to an embodiment of the invention the method therefore comprises the step of retrieving (23a) one or more tracking records (130) for a parent marked physical item (350) wherein the tracking records (130) are stored in a second storage location (150) of the computer (101) in the track and trace system (100), and wherein a position of the tracking records (130) is determined by a combination of the first and second identifiers (201, 202) of a code (200) of a parent marked physical item (350) obtained in the step of retrieving (23) the parent-child relationships (303) and updated parent child relationships (403).

It can be seen from the above that it is not necessary to store tracking records (130) for items that have a parent. If we consider a real-life example where a container may contain e.g. 1000 marked physical items (350), it is seen that the savings in storage capacity may be considerable.

One of the main advantages of the invention is that the same principle may be applied even if re-packaging occurs one or more times in the supply chain. The section (111) will always contain the latest parent-child relationships of the marked physical item (350) requested and based on this, the containing parent and contained children can be found before querying only the necessary larger and slower tracking records (130).

Figure 5:
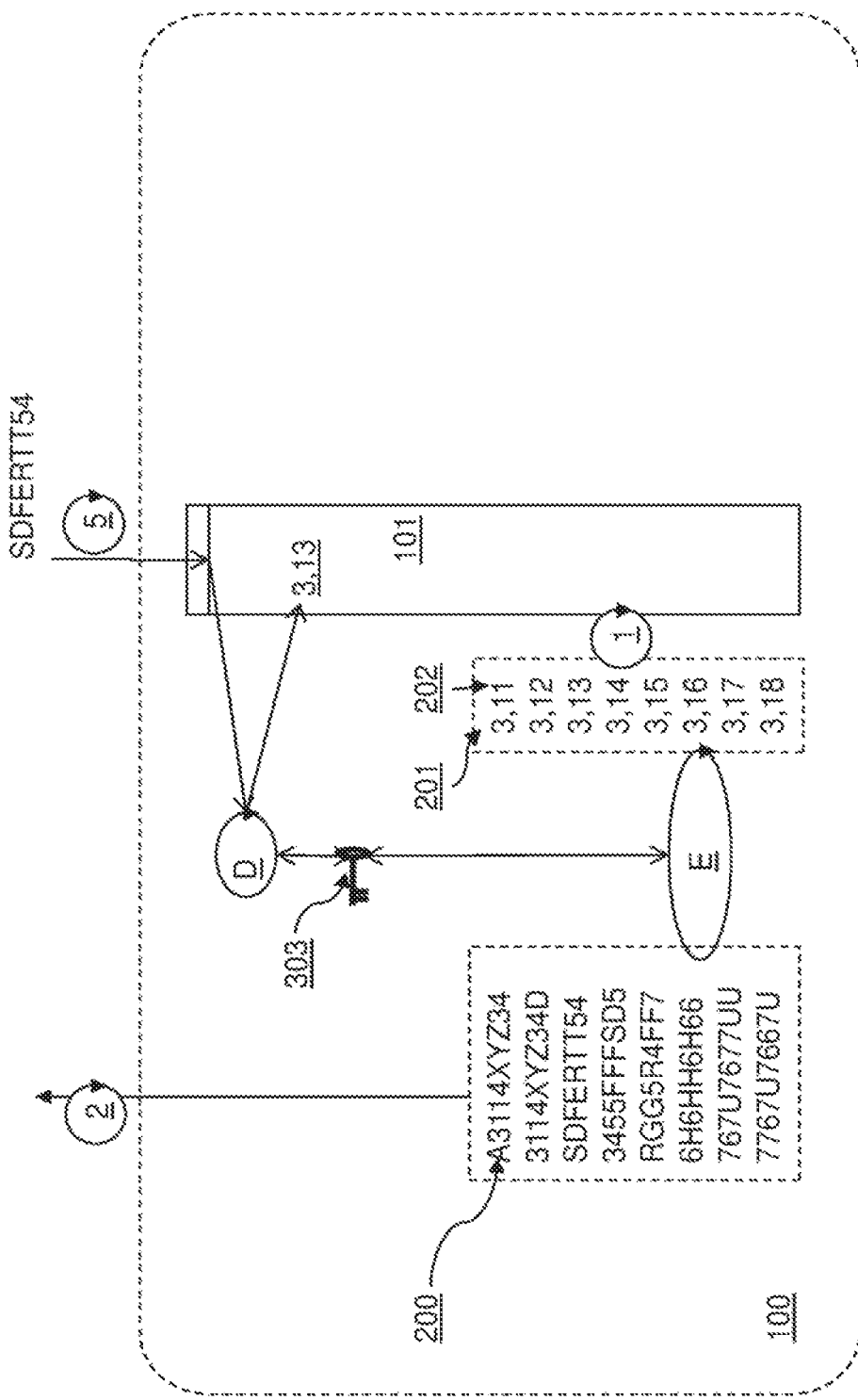
FIG. 5 illustrate in a schematic view encryption of codes before marking on physical items (200) and decryption of the codes (200) before performing any action in the track and trace system.

It might be desirable to encrypt the codes (200) marked on the items. In FIG. 5 it is shown how the codes (200) may be encrypted (E) by a unique key (303) before they are transferred (2) to the marking location (300). The items will then be marked with encrypted unique codes (200) that may have to be decrypted (D) before the first and the second identifiers (201, 202) may be used by the track and trace system (100) to read and write data about the physical items (350) marked with the encrypted codes (200). This is also illustrated in FIG. 5 where the encrypted code "SDFERTT54" enters the system, i.e. for tracing, and the encrypted code is decrypted in a decrypting process (D), using the same unique key (303) that was used for encoding (E). This results in the unique code (200) 3,13 that may now be processed further as described above. According to the encoding scheme it may also be possible to determine whether the entered encrypted code is false or not. E.g., if it the decrypted value does not correspond to a legal value or falls within a pre-defined range, the encrypted code is most probably false.

According to an embodiment of the invention the method comprises the steps of encrypting (E) the codes (200) with a unique key (303) before the codes are marked on the physical items (350), and decrypting (D) the codes (200) with the unique key (303).

The invention claimed is:

1. A method for storing and retrieving packaging and re-packaging hierarchical code relations (304) of traceable physical items (350), comprising the steps of:
   in a first computer system (101) in a track and trace system (100),
   generating (1) a set of unique codes (200),
   each unique code (200) comprising a first identifier (201) and a second identifier (202), and encrypting said unique codes (200);

transferring (2) said unique codes (200) from said first computer system (101) to a packaging computer system (301) at an item marking location (300);

at said item marking location (300), marking (3) two or more physical items (350) while establishing a physical packaging hierarchy (305), each physical item (350) with a said unique code (200);

registering (4) packaging relations (303) in an aggregate data file (302) in said packaging computer system (301) during packaging of said marked physical items (350), said packaging relations (303) being relations between said code (200) of each containing marked physical item (350) and said code (200) of each contained marked physical items (350), and registering an initial item parameter (120) comprising time and place for the marking (3);

transferring (5) said aggregate data file (302) with said packaging relations (303) between said codes (200) of said marked physical items (350) and said initial item parameters (120) from said packaging computer system (301), to said first computer system (101);

in said first computer system (101), decrypting said codes (200) to identify said first and second identifiers (201, 202);

identifying and generating (6) for each said code (200) in said packaging relations (303) in said aggregate data file (302), an initial hierarchical code relation (304) expressed as a sequence of codes including a current code (200), a parent code (200, P) relative to said current code (200), and one or more child codes (200, C) relative to said current code (200), based on said packaging relations (303); and identifying said initial item parameter (120) for said current code (200), and storing (7), for each said code (200), said parent code (200, P) and said one or more child codes (200, C) of said initial hierarchical code relations (304), and said initial item parameter (120), in a section (111) of a data storage location (110) of said first computer system (101), wherein a start position (112) of said section (111) is determined by a combination of said first and second identifiers (201, 202) of said code (200) of said marked physical item (350);

in a re-packaging location (400), re-packaging (10) two or more of said physical items (350) into updated packaging relations (403) and registering updated item parameters (120);

transferring (12) said updated packaging relations (403) with said updated item parameters (120) to said first computer system (101) of said track and trace system (100);

in said track and trace system (100), decrypting said codes (200) to identify said first and second identifiers (201, 202);

identifying and generating (13), for each said code (200) in said updated packaging relations (403), an updated hierarchical code relation (304) expressed as a sequence of codes including a current code (200), a parent code (200, P) relative to said current code (200) and/or one more child codes (200, C) relative to said current code (200) based on the updated packaging relations (403), and identifying said updated item parameter (120) for said current code (200); and adding (14), for each said code (200), said parent code (200, P) and/or said one more child codes (200, C) of said updated hierarchical code relations (304), and said updated item parameter (120) to said section (111) of said data storage location (110) as an appendix to the previously stored sequence of codes representing said initial hierarchical code relation (304) and said initial item parameter (120), such that after re-packaging, for each code (200) of said two or more of said physical items (350), said section (111) of said data storage location (110) stores an updated sequence of codes (200) including both said initial hierarchical code relation (304), said initial item parameter (120), said updated hierarchical code relation (304), and said updated item parameter (120), wherein said method further comprises the step of retrieving (23a) one or more tracking records (130) for a parent marked physical item (350), wherein said tracking records (130) are stored in a second storage location (150) of said first computer (101) in said track and trace system (100), and wherein a position of said tracking records (130) is determined by a combination of said first and second identifiers (201, 202) of a code (200) of a parent marked physical item (350) obtained in said step of retrieving (23) said packaging relationships (303) and updated packaging relationships (403).

2. The method according to claim 1, said item parameter (120) further comprising validity status about said marked physical item (350) such as not being for sale, said marked physical item (350) being withdrawn, or static information such as a serial number, or a time stamp, a flag or status such as recalled, rejected, quarantined, quality passed, returned, taxes paid, a tracing location (500) that the code (200) is at currently;

during entering (20) for tracing (20) at a tracing location (500), registering time and place for the marking, re-packaging or reading (20) as part of the item parameter (120), and storing (7, 14, 23) said item parameter (120) with said updated hierarchical code relations (304) in said section (111).

3. The method according to claim 1, further comprising the steps of:

at a tracing location (500);

entering (20) one or more codes (200) in a computer based terminal (501) in said tracing location (500);

transferring (21) said codes (200) from said computer based terminal (501) to said track and trace system (100);

in said track and trace system (100);

decrypting said codes (200) to identify said first and second identifiers (201, 202);

identifying (22) said first and second identifiers (201, 202) of said codes (200)

determining said start position (112) of said section (111) of said storage location (110) in said track and trace system (100);

retrieving (23) said hierarchical code relations (304), said initial item parameters (120), said updated hierarchical code relations (304), and said updated item parameters (120) stored in said section (111) for said codes (200); and transferring (24) said hierarchical code relations (304), said initial item parameters (120), said updated hierarchical code relations (304), and said updated item parameters (120) for said codes (200) back to said computer based terminal (501).

4. The method according to claim 3, said item parameter (120) further comprising:
at said tracing location (500);
while transferring (21) said codes (200) from said computer based terminal (501) to said track and trace system (100), transferring a tracing location (500) that the code (200) is at currently;
in said track and trace system (100);
adding said tracing location (500) that the code (200) is at currently, as part of said item parameter (120) in said section (111).

5. A track and trace system (100) arranged for storing (7) and retrieving (23) hierarchical code relations (304) during packaging and re-packaging of traceable physical items (350), comprising:
a first computer system (101) with one or more data storage locations (110), each with one or more sections (111);
said first computer system (101) being configured to:
receive packaging relationships (303) between unique codes (200) marked on said physical items (350) at a packaging location (300), said packaging relationships (303) being pairwise relations between said code (200) of each containing marked physical item (350) and said code (200) of each contained marked physical items (350), from a packaging computer system (301) wherein each code (200) comprises at least a first identifier (201) and a second identifier (202);
identify (6) hierarchical code relations (304) expressed as parent and/or one or more child codes (304, P, C), said parent code (200, P) being relative to said current code (200), and said one or more child codes (200, C) being relative to said current code (200), for each said code (200) in said packaging relationships (303); and
store (7) said hierarchical code relations (304, P, C) for each said code (200) in said section (111),
wherein said first computer system (101) is arranged for receiving an aggregate data file (302) comprising said packaging relationships (303) and identifying said hierarchical code relations (304) from said aggregate data file (302), and
wherein a start position (112) of said section (111) is determined by a combination of said first and second identifiers (201, 202) of said code (200) of said marked physical item (350),
said first computer system (101) being further configured to:
receive updated packaging relationships (403) being transferred (12) from a re-packaging location (400), said updated packaging relationships (403) arising from re-packaging (10) of two or more said physical items (350);
identify (13) for each said code (200) in said updated packaging relationships (403), updated hierarchical code relations (304) expressed as parent and/or child codes (200, P, C); and
for each said code (200), add (14) said updated hierarchical code relations (304) to said section (111) of said data storage location (110),
wherein said track and trace system is further configured to retrieve (23a) one or more tracking records (130) for a containing "parent" marked physical item (350),
wherein said tracking records (130) are stored in a second storage location (150) of said first computer (101) in said track and trace system (100), and
wherein a position of said tracking records (130) is determined by a combination of said first and second identifiers (201, 202) of a code (200, P) of said containing "parent" marked physical item (350) obtained in said step of retrieving (23) said packaging relationships (303) and updated packaging relationships (403).

6. The system according to claim 5, wherein said first computer system is further configured to:
transfer an item parameter (120) for each marked physical item (350) in said packaging relationships (303) in said aggregate data file (302),
identify said item parameter (120), and
store said item parameter (120) in said section (111).

7. The system according to claim 6, wherein said first computer system is further configured to:
encrypt (E) said codes (200) with a unique key (303) before said codes (200) are marked on said physical items (350); and
decrypt (D) said codes (200) with said unique key (303).

8. A method for storing and retrieving packaging and re-packaging hierarchical code relations (304) of traceable physical items (350), comprising the steps of:
at an item marking location (300),
marking (3) two or more physical items (350) to be packaged in a packaging hierarchy (305), each with a unique code (200) comprising at least a first identifier (201) and a second identifier (202);
registering (4), packaging relations (303) in an aggregate data file (302) in a packaging computer system (301) during packaging of said marked physical items (350), said packaging relationships (303) being relations between said code (200) of each containing marked physical item (350) and said code (200) of each contained marked physical items (350); and
transferring (5) said aggregate data file (302) with said packaging relationships (303) between said codes (200) of said marked physical items (350) from a packaging computer system (301), to a first computer system (101) of a track and trace system (100);
in said first computer system (101),
identifying (6) for each said code (200) in said packaging relationships (303) in said aggregate data file (302), hierarchical code relations (304) expressed as parent and/or one or more child codes (200, P, C), said parent code (200, P) being relative to said current code (200), and said one or more child codes (200, C) being relative to said current code (200); and
storing (7), for each said code (200), said hierarchical code relations (304) in a section (111) of a data storage location (110) of said first computer system (101), wherein a start position (112) of said section (111) is determined by a combination of said first and second identifiers (201, 202) of said code (200) of said marked physical item (350);
in a re-packaging location (400),
re-packaging (10) two or more said physical items (350) into updated packaging relationships (403);
transferring (12) said updated packaging relationships (403) to said first computer system (101) of said track and trace system (100);
in said track and trace system (100), identifying (13) for each said code (200) in said updated packaging relationships (403), updated hierarchical code relations (304) expressed as parent and/or child codes (200, P, C); and
    for each said code (200), adding (14) said updated hierarchical code relations (304) to said section (111) of said data storage location (110), in a tracing location (500),
entering (20) one or more codes (200) in a computer based terminal (501);
transferring (21) said codes (200) from said tracing location (500) to said track and trace system (100);
identifying (22) said first and second identifiers (201, 202) of said codes (200) in said track and trace system (100);
determining said start position (112) of said section (111) of said storage location (110) in said track and trace system (100);
retrieving (23) said hierarchical code relations (304) and said updated hierarchical code relations (304) stored in said section (111) for said codes (200); and
transferring (24) said hierarchical code relations (304) and said updated hierarchical code relations (304) back to said computer based terminal (501),
wherein said method further comprises the step of retrieving (23a) one or more tracking records (130) for a containing "parent" marked physical item (350), wherein said tracking records (130) are stored in a second storage location (150) of said first computer (101) in said track and trace system (100), and wherein a position of said tracking records (130) is determined by a combination of said first and second identifiers (201, 202) of a code (200, P) of said containing "parent" marked physical item (350) obtained in said step of retrieving (23) said packaging relationships (303) and updated packaging relationships (403).

9. The method according to claim 8, wherein the step of transferring (5) further comprises transferring an item parameter (120) for each marked physical item (350) in said packaging relationship structure (302), and said step of identifying (6) further comprises identifying said item parameter (120), and said step of storing (7) further comprises storing said item parameter (120) in said section (111).

10. The method according to claim 8, further comprising the steps of:
    encrypting (E) said codes (200) with a unique key (303) before said codes (200) are marked (3) on said physical items (350); and
    decrypting (D) said codes (200) with said unique key (303).

11. A track and trace system (100) arranged for storing (7) and retrieving (23) packaging code relations (304) and re-packaging hierarchical code relations (304) of traceable physical items (350) in a packaging hierarchy (305), comprising:
    an item marking location (300) configured to:
        mark (3) two or more physical items (350) being packaged in said packaging hierarchy (305), each with a unique code (200) comprising at least a first identifier (201) and a second identifier (202),
        register (4), in a packaging computer system (301), packaging relations (303) in an aggregate data file (302) during packaging of said marked physical items (350), said packaging relationships (303) being relations between said code (200) of each containing marked physical item (350) and said code (200) of each contained marked physical items (350), and
        transfer (5) said aggregate data file (302) with said packaging relations (303) from said packaging computer system (301), to a first computer system (101) of the track and trace system (100);
    said first computer system (101) being configured to:
        identify (6) for each said code (200) in said packaging relationships (303) in said aggregate data file (302), hierarchical code relations (304) expressed as parent and/or one or more child codes (200, P, C), said parent code (200, P) being relative to said current code (200), and said one or more child codes (200, C) being relative to said current code (200); and
        store (7), for each said code (200), said hierarchical code relations (304) in a section (111) of a data storage location (110) of said first computer system (101), wherein a start position (112) of said section (111) is determined by a combination of said first and second identifiers (201, 202) of said code (200) of said marked physical item (350);
    a re-packaging location (400) being configured to:
        re-package (10) two or more of said physical items (350) into updated packaging relationships (403),
        transfer (12) said updated packaging relationships (403) to said first computer system (101);
        identify (13), in said track and trace system (100), for each said code (200) in said updated packaging relationships (403), updated hierarchical code relations (304) expressed as parent and/or child codes (200, P, C); and
        for each said code (200), add (14) said updated hierarchical code relations (304) to said section (111) of said data storage location (110); and
    a tracing location (500) being configured to:
        enter (20) one or more codes (200) in a computer based terminal (501);
        transfer (21) said codes (200) from said tracing location (500) to said track and trace system (100),
        identify (22) said first and second identifiers (201, 202) of said codes (200) in said track and trace system (100),
        determine said start position (112) of said section (111) of said storage location (110) in said track and trace system (100),
        retrieve (23) said hierarchical code relations (304) and said updated hierarchical code relations (304) stored in said section (111) for said codes (200); and
        transfer (24) said hierarchical code relations (304) and said updated hierarchical code relations (304) back to said computer based terminal (501),
wherein said system is further configured to retrieve (23a) one or more tracking records (130) for a containing "parent" marked physical item (350),
wherein said tracking records (130) are stored in a second storage location (150) of said first computer (101) in said track and trace system (100), and
wherein a position of said tracking records (130) is determined by a combination of said first and second identifiers (201, 202) of a code (200, P) of said containing "parent" marked physical item (350) obtained in said step of retrieving (23) said packaging relationships (303) and updated packaging relationships (403).

12. The system according to claim 11, wherein the system is further configured to
    encrypt (E) said codes (200) with a unique key (303) before said codes (200) are marked on said physical items (350); and
    decrypt (D) said codes (200) with said unique key (303).

\* \* \* \* \*